UNITED STATES PATENT OFFICE.

CHRISTIAN HEINZINGER, OF NEW YORK, N. Y.

MEDICINAL PREPARATION.

960,915.  Specification of Letters Patent.  Patented June 7, 1910.

No Drawing.  Application filed August 23, 1909.  Serial No. 514,143.

*To all whom it may concern:*

Be it known that I, CHRISTIAN HEINZINGER, a subject of the German Emperor, and a resident of the city of New York, borough of Brooklyn, in the county of Kings and State of New York, have invented a new and Improved Medicinal Preparation, of which the following is a full, clear, and exact description.

This invention relates to medicinal preparations and more particularly to a lotion for use in affections of the eye, and includes an extract of the leek or *Allium porrum*.

The object of the invention is to provide a simple and inexpensive lotion for use in various diseases of the eye, which has a pleasant and stimulating action with regard to the tissues, and which is particularly useful for the treatment of trachoma and like diseases.

I have found that an extract of the leek, which comprises one species of the plant genus *Allium*, is of great utility when employed in a suitable medicinal preparation for use in treatment of the eye for various diseases. The leek to which I have reference is the ordinary biennial culinary plant of that name, otherwise known as the *Allium porrum*, and allied to the *Allium cepa* or onion.

I prefer to crush the root and the white part of the leek and to distil the resulting liquid to purify it. The distillate which I employ in the medicinal preparation or lotion is equal in bulk to about half of the liquid resulting from the crushing and pressing of the leek. In order to preserve the distillate I employ preferably spirits of camphor, but any other substance adapted for the purpose can be used. It will be understood that the spirits of camphor or the other substance acts as a preservative for the leek extract. The proportions may be varied to suit individual preference or special conditions, though I prefer to use approximately 60% of the leek juice distillate and 40% of the preservative.

Having thus described my invention, I claim as new, and desire to secure by Letters Patent:—

1. A lotion, for external use in affections of the eyes, including a distillate of the expressed juice of leek, and spirits of camphor as a preservative.

2. A lotion, for external use in affections of the eyes, including about 60% of a distillate of the expressed juice of leek, and about 40% of spirits of camphor.

In testimony whereof I have signed my name to this specification in the presence of two subscribing witnesses.

CHRISTIAN HEINZINGER.

Witnesses:
JOHN K. BRACHVOGEL,
PHILIP D. ROLLHAUS.